United States Patent
Isozaki et al.

(10) Patent No.: US 6,770,703 B2
(45) Date of Patent: Aug. 3, 2004

(54) PROCESS FOR THE PREPARATION OF POWDER COATING COMPOSITION

(75) Inventors: Tsuyoshi Isozaki, Hiratsuka (JP); Masahiro Kurokawa, Hiratsuka (JP)

(73) Assignee: Mitsubishi Gas Chemical Company (JP)

( * ) Notice: Subject to any disclaimer, the term of this patent is extended or adjusted under 35 U.S.C. 154(b) by 259 days.

(21) Appl. No.: 09/880,781

(22) Filed: Jun. 15, 2001

(65) Prior Publication Data

US 2001/0042933 A1 Nov. 22, 2001

Related U.S. Application Data

(62) Division of application No. 09/317,170, filed on May 24, 1999.

(30) Foreign Application Priority Data

Jun. 4, 1998 (JP) ............................................. 10-156054
Jul. 17, 1998 (JP) ............................................. 10-203529

(51) Int. Cl.$^7$ .................... C09D 125/08; C09D 137/00; C08F 2/06
(52) U.S. Cl. ...................... 524/548; 526/212
(58) Field of Search ................................ 526/210, 212; 524/765, 548; 528/501, 502 E

(56) References Cited

U.S. PATENT DOCUMENTS

| | | | |
|---|---|---|---|
| 3,758,635 A | 9/1973 | Labana et al. | |
| 3,940,453 A | 2/1976 | Labana et al. | |
| 3,989,767 A | 11/1976 | Homma et al. | |
| 4,027,066 A * | 5/1977 | Victorius | 428/334 |
| 4,042,560 A | 8/1977 | Peng | |
| 4,051,194 A | 9/1977 | Ishikawa et al. | |
| 4,057,607 A | 11/1977 | Soehngen et al. | |
| 4,065,532 A | 12/1977 | Wild et al. | |
| 4,073,773 A | 2/1978 | Banucci et al. | |
| 4,367,318 A | 1/1983 | Ishimura et al. | |
| 5,446,099 A | 8/1995 | Yoshida et al. | |
| 5,521,250 A | 5/1996 | Wamprecht et al. | |
| 5,786,445 A | 7/1998 | Wulff et al. | |
| 5,804,676 A * | 9/1998 | Hieda et al. | 526/65 |
| 5,900,463 A | 5/1999 | Tanimoto et al. | |
| 6,121,387 A | 9/2000 | Choudhery | |
| 2003/0073780 A1 * | 4/2003 | Koike et al. | 525/10 |

FOREIGN PATENT DOCUMENTS

EP 0 863 167 A 9/1998

* cited by examiner

*Primary Examiner*—Matthew A. Thexton
(74) *Attorney, Agent, or Firm*—Lorusso, Loud & Kelly

(57) ABSTRACT

A process for the preparation of a powder coating composition, wherein 5–90% by weight of at least one monomeric compound selected from glycidyl group-containing unsaturated compounds and methylglycidyl group-containing unsaturated compounds is copolymerized with 95–10% by weight of an ethylenically unsaturated monomer in methanol to obtain a resin solution. The resin solution is spray-dried to obtain a powdery resin. Alternatively, the resin solution is fed to an extruder having a die and a plurality of vent ports and extruded through the die, while removing volatile matters through the vent ports, to obtain extrudates. The extrudates are pulverized to obtain a powdery resin.

9 Claims, No Drawings

PROCESS FOR THE PREPARATION OF POWDER COATING COMPOSITION

CROSS-REFERENCE TO RELATED APPLICATION

This application is a division of U.S. Ser. No. 09/317,170, filed May 24, 1999, pending.

BACKGROUND OF THE INVENTION

This invention relates to a process for the preparation of a powder coating composition containing a copolymer of a glycidyl group- or methylglycidyl group-containing unsaturated monomeric compound with an ethylenically unsaturated comonomer.

Powder coating compositions are now used in a wide variety of fields in place of liquid coating compositions which cause, during coating and hardening, air pollution by the generation of organic vapors. In particular, powder coating compositions containing a glycidyl group-containing acrylic resin and a polybasic acid curing agent are advantageously used because they give coatings having a beautiful appearance and excellent weatherability.

One known method for the preparation of such a glycidyl group-containing acrylic resin powder coating composition includes suspension-, bulk- or solution-polymerizing a glycidyl group-containing unsaturated monomeric compound with an ethylenically unsaturated monomer to obtain an acrylic copolymer-containing product. The product is treated for the removal of volatile matters such as a solvent and is subsequently coarsely pulverized and then dry-mixed with a curing agent, a pigment and other additives using a mill. The milled mixture is then melted, kneaded, pelletized, ground and sieved to obtain the powder coating composition.

The known method, however, has the following drawbacks. Namely, when suspension polymerization is adopted in the above method, a large amount of a chain transfer agent must be used in order to obtain a relatively low molecular weight copolymer. When a bulk polymerization is adopted, on the other hand, there is caused a drawback that a high polymerization degree cannot be attained. With a solution polymerization using an inert solvent such as toluene or xylene, a step for removing the solvent from the polymerization product must be performed at a high temperature under a high vacuum for a long period of time.

Additionally, since the above acrylic copolymer obtained by the removal of volatile matters is in the form of a bulk at a low temperature, it is necessary to coarsely pulverize same before mixing with the curing agent, pigment and additives. Further, kneading, pelletizing and grinding of the mixture must be carried out to obtain a powder coating composition.

SUMMARY OF THE INVENTION

It is, therefore, an object of the present invention to provide a process for the preparation of a powder coating composition containing a glycidyl group- or methylglycidyl group-containing acrylic resin, which is devoid of the drawbacks of the above conventional process.

Another object of the present invention is to provide an economical method for the preparation of a powder coating composition of the above-mentioned type.

In accomplishing the foregoing object, the present invention provides a process for the preparation of a powder coating composition, comprising copolymerizing 5–90% by weight of at least one monomeric compound selected from the group consisting of glycidyl group-containing unsaturated compounds and methylglycidyl group-containing unsaturated compounds with 95–10% by weight of an ethylenically unsaturated monomer in methanol to obtain a resin solution; and spray-drying said resin solution to obtain a powdery resin.

In another aspect, the present invention provides a process for the preparation of a powder coating composition comprising the steps of:

copolymerizing 5–90% by weight of at least one compound selected from the group consisting of glycidyl group-containing unsaturated compounds and methylglycidyl group-containing unsaturated compounds with 95–10% by weight of an ethylenically unsaturated monomer in methanol to obtain a resin solution;

feeding said resin solution to an extruder having a die and a plurality of vent ports;

while removing volatile matters existing in said resin solution in said extruder from said extruder through said vent ports, extruding said resin solution through said die to obtain extrudates; and pulverizing said extrudates.

Other objects, features and advantages of the present invention will become apparent from the detailed description of the preferred embodiments of the invention to follow.

DETAILED DESCRIPTION OF THE PREFERRED EMBODIMENTS OF THE INVENTION

The process for the preparation of a powder coating composition according to the present invention includes copolymerizing 5–90% by weight of glycidyl group-containing unsaturated compounds and/or methylglycidyl group-containing unsaturated compounds with 95–10% by weight of an ethylenically unsaturated monomer in methanol to obtain a resin solution.

The copolymerization is generally performed at a temperature of 10–150° C. under a pressure of 0–200 kgf/cm$^2$. The methanol is generally used in an amount so that the content thereof in the resin solution is in the range of 5–99.99% by weight, preferably 10–80% by weight. The use of methanol as the solvent has a merit that the molecular weight of the copolymer can be controlled as desired and that the powder coating composition can give a coating having good properties such as surface smoothness and gloss.

The copolymerization in the methanol solvent is preferably carried out to provide a polymerization degree of at least 98%, more preferably at least 99%, most preferably at least 99.5% for reasons of minimizing the content of volatile matters in the powder coating composition. The copolymerization is also preferably performed so that the copolymer resin obtained has a number average molecular weight of 500–50,000, more preferably 3,000–10,000 and a glass transition point of 20–120° C., more preferably 30–100° C., most preferably 40–80° C. for reasons of obtaining a powder coating composition which has suitable storage stability and gives a coating having good smoothness and flexibility.

Any glycidyl group- and/or methylglycidyl group-containing unsaturated monomeric compound may be used for the purpose of the present invention. A glycidyl group- and/or methylglycidyl group-containing unsaturated monomeric compound giving a thermosetting resin upon copolymerization is suitably used. Illustrative of suitable glycidyl group- and/or methylglycidyl group-containing unsaturated monomeric compound are glycidyl acrylate, glycidyl methacrylate, methylglycidyl acrylate and methylglycidyl methacrylate.

The ethylenically unsaturated monomer is a monomer other than the above unsaturated monomeric compound and capable of copolymerizing with the above unsaturated monomeric compound and is preferably a monomer capable of giving a thermosetting resin upon copolymerization with the above unsaturated monomeric compound. Examples of the ethylenically unsaturated monomers include alkyl acrylates and methacrylates, such as methyl methacrylate, methyl acrylate, ethyl methacrylate, ethyl acrylate, n-butyl methacrylate, n-butyl acrylate, i-butyl methacrylate, i-butyl acrylate, t-butyl methacrylate, t-butyl acrylate, 2-ethylhexyl methacrylate, 2-ethylhexyl acrylate, lauryl methacrylate, lauryl acrylate; cycloalkyl acrylates and methacrylates, such as cyclohexyl methacrylate and cyclohexyl acrylate; hydroxyalkyl acrylates and methacrylates, such as 2-hydroxyethyl methacrylate and 2-hydroxyethyl acrylate; styrene; α-alkylstyrenes, such as α-methylstyrene; acrylonitrile; acrylamide; and methacrylamide.

In one embodiment of the present invention, the resin solution thus obtained by the above copolymerization is spray-dried to obtain a powder resin composition having any desired average particle diameter of, for example, about 1–100 μm. This method is advantageous because the removal and recovery of methanol may be performed simultaneously with the formation of the powder coating composition.

Before the spray-drying, the resin solution is preferably mixed with a curing agent, a pigment and/or any other suitable additives (any other ingredients to be added to a powder coating composition), so that a uniform powder coating composition can be easily obtained. It is also preferred that the mixing be performed by admixing the resin solution with a methanol solution or dispersion containing the curing agent, additives and/or pigment using a continuous mixer, for reasons that the uniformity of the powder coating composition is further improved and that the mixing efficiency is further improved. Reduction of a time for mixing the resin solution with the curing agent is advantageous because the reaction therebetween during mixing can be minimized.

As the continuous mixer, there may be used a double tube-type static mixer ordinarily used as a polymerization reactor or a heat exchanger or a mixing head generally used for a reaction injection molding (RIM) device. Illustrative of suitable mixers are N40 Mixer (manufactured by Noritake Co., Ltd.), Collision Mixing Good (manufactured by Krauss-Mafferi Inc.) and Super Spencer (manufactured by Tsubakou Yokohama Sales Co., Ltd.).

Any customarily employed curing agent, pigment and other additives may be suitably used for the purpose of the present invention. The mixing is preferably performed by admixing the resin solution with a methanol solution or dispersion containing the curing agent, additives and/or pigment using a continuous mixer.

The curing agent may be, for example, a polybasic acid such as azelaic acid, 1,10-decanedicarboxylic acid, 1,12-dodecanedicarboxylic acid, adipic acid, maleic acid, trimellitic acid, pyromellitic acid, naphthalene dicarboxylic acid or isophthalic acid; an acid anhydride such as succinic anhydride, phthalic anhydride, itaconic anhydride, trimellitic anhydride or pyromellitic anhydride; an aromatic amine such as metaphenylenediamine or metaxylenediamine; an aliphatic amine; an alicyclic amine; dicyandiamide; a melamine compound; a hydrazine compound; a maleimide; or a cyanate.

The pigment may be, for example, a coloring pigment such as titanium dioxide, red iron oxide, carbon black, phthalocyanine blue, phthalocyanine green, a quinacridone pigment or an azo pigment; or a loading pigment such as talc, calcium carbonate or precipitated barium sulfate.

Additives may include, for example, a leveling agent such as polysiloxane, a plasticizer, a UV-absorbing agent, an antioxidation agent, a dispersing agent, a curing accelerator (curing catalyst), benzoin (defoamer) and a flow controlling agent.

The spray-drying of the resin solution may be carried out with any conventionally employed spraying device. A nozzle atomizing-type spraying device is suitably used for reasons that the powder coating composition thus obtained has a desired average particle diameter and a narrow particle diameter distribution. Illustrative of commercially available spray-drying devices are Turning-type Spray-Dryers (a non-combustible gas closed-type) manufactured by Sakamoto Giken Co., Ltd. and CL-series Spray-Dryers manufactured by Okawara Kako Co., Ltd. The spray-drying is generally performed at a resin solution temperature of 20–100° C., a pressure in a receiver for receiving sprayed particles of ambient pressure or a reduced pressure of about 100 mmHg or higher and a temperature in the receiver of 40–200° C.

In another embodiment of the present invention, the resin solution obtained by the above copolymerization is extruded. The extrudates obtained are then pulverized to obtain a powder coating composition. The extrusion is performed using an extruder having a die and a plurality of vent ports. The resin solution is fed to the extruder and extruded while removing volatile matters, existing in the resin solution in the extruder, from the extruder through the vent ports.

A monoaxial or biaxial extruder conventionally used for kneading and extruding plastic materials may be used for the purpose of the present invention. For example, a monoaxial extruder TP20 (screw diameter: 20 mm, L/D: 28; manufactured by Thermoplastics Industry Co., Ltd.) may be used. The extrusion is preferably carried out at a temperature of 70–120° C. and a reduced pressure of 1–1000 torr with a screw revolution rate of 30–120 rpm.

The resin solution, before being fed to the extruder, is preferably mixed with a curing agent, a pigment and/or any other suitable additives, such as hereinbefore described. The mixing is preferably performed by admixing the resin solution with a methanol solution or dispersion containing the curing agent, additives and/or pigment using a continuous mixer.

The extrudates, generally in the form of pellets, are pulverized with any customarily employed pulverizer, such as a pin disc mill, to a desired particle size of, for example, about 1–100 μm.

With the method according to the present invention, removal and recovery of the volatile matters formed during the spray-drying or extrusion can be easily and efficiently carried out because methanol is used as a solvent for the copolymerization. Additionally, because the amount of volatile matters remaining in the powder coating composition thus obtained is extremely small, the powder coating composition exhibits excellent properties. The above spray-drying or extrusion is preferably performed so that the powder coating composition obtained has a volatile matter content of 1.5% by weight or less, more preferably 1% by weight or less, most preferably 0.5% by weight or less.

The following examples will further illustrate the present invention. Parts are by weight.

EXAMPLE 1

In a reactor equipped with a thermometer, a stirrer, a reflux condenser, a pressure controller using nitrogen gas and a bottom discharging conduit, 67 parts of methanol were charged and heated to 90° C., to which were gradually added 25 parts of methyl methacrylate, 20 parts of glycidyl methacrylate, 40 parts of styrene, 15 parts of n-butyl methacrylate and 6 parts of azobisisobutyronitrile with stirring through 4 hours while maintaining the mixture at 90° C. The reaction mixture was further maintained at that temperature for 6 hours to obtain a resin solution. Thereafter, a mixture containing 166 parts of methanol, 16 parts of dodecane dicarboxylic acid, 0.6 part of benzoin and 0.6 part of a leveling agent (Modaflow; manufactured by Monsant Inc.) was added to the resin solution and the blend was stirred for 1 hour to obtain a uniform mixture. This mixture was fed through the discharging conduit to a spray dryer and spray-dried to obtain a powder coating composition having an average particle diameter of 15 μm. The coating composition was measured for a non-volatile matter content and tested for anti-blocking property according to the method shown below. The powder coating composition was applied to a steel plate previously treated with zinc phosphate by electrostatic coating and then cured at 180° C. for 20 minutes in an oven to form a resin coat thereover. The resin coat thus formed was tested for surface smoothness and gloss thereof according to the methods shown below. The results are summarized in Table 1.

Anti-blocking property:

The powder coating composition was stored at 40° C. for 7 days and the anti-blocking property was then evaluated as follows:

A: No lumps are observed

B: Lumps are formed but cannot be picked up with fingers

C: Lumps are formed and can be picked up with fingers

Smoothness:

The coat was observed with naked eyes and the surface smoothness was evaluated as follows:

A: No surface roughness is observed

B: Protrusions and depressions are slightly observed

C: Considerable protrusions and depressions are observed

Gloss:

Gloss was measured in accordance with Japanese Industrial Standard JIS K5400 7.6 at an angle of 60°.

EXAMPLE 2

In a reactor as used in Example 1, 67 parts of methanol were charged and heated to 80° C., to which were gradually added 40 parts of methyl methacrylate, 30 parts of glycidyl methacrylate, 15 parts of styrene, 15 parts of n-butyl acrylate and 5 parts of 2,2'-azobis(2,4-dimethylvaleronitrile) with stirring through 4 hours while maintaining the mixture at 80° C. The reaction mixture was further maintained at that temperature for 6 hours to obtain a resin solution. Thereafter, 25 parts of dodecane dicarboxylic acid, 0.6 part of benzoin and 0.6 part of a leveling agent (Modaflow; manufactured by Monsant Inc.) were added to the resin solution and the blend was stirred for 2 hours to obtain a uniform mixture. This mixture was charged in an extruder provided with a plurality of vent ports and extruded into strands and pelletized. The pellets were ground and sieved to obtain a powder coating composition having an average particle diameter of 15 μm. The powder coating composition was tested in the same manner as that in Example 1 to give the results shown in Table 1.

EXAMPLE 3

In a reactor as used in Example 1, 67 parts of methanol were charged and heated to 70° C., to which were gradually added 15 parts of methyl methacrylate, 40 parts of glycidyl methacrylate, 30 parts of styrene, 15 parts of cyclohexyl methacrylate and 4 parts of 2,2'-azobis(2,4-dimethylvaleronitrile) with stirring through 4 hours while maintaining the mixture at 70° C. The reaction mixture was further maintained at that temperature for 6 hours to obtain a resin solution. Thereafter, a mixture containing 500 parts of methanol, 33 parts of dodecane dicarboxylic acid, 0.6 part of benzoin and 0.6 part of a leveling agent (Modaflow; manufactured by Monsanto Inc.) was added to the resin solution and the blend was stirred for 2 hours to obtain a uniform mixture. This mixture was fed to a spray dryer and spray-dried to obtain a powder coating composition having an average particle diameter of 6 μm. The coating composition was tested in the same manner as that in Example 1 to give the results shown in Table 1.

EXAMPLE 4

In a reactor as used in Example 1, 567 parts of methanol were charged and heated to 70° C., to which were gradually added 15 parts of methyl methacrylate, 40 parts of glycidyl methacrylate, 30 parts of styrene, 15 parts of t-butyl acrylate and 4 parts of 2,2'-azobis(2,4-dimethylvaleronitrile) with stirring through 4 hours while maintaining the mixture at 70° C. The reaction mixture was further maintained at that temperature for 6 hours to obtain a resin solution. Thereafter, 33 parts of dodecane dicarboxylic acid, 0.6 part of benzoin and 0.6 part of a leveling agent (Modaflow; manufactured by Monsant Inc.) was added to the resin solution and the blend was stirred for 1 hour to obtain a uniform mixture. This mixture was fed to a spray dryer and spray-dried to obtain a powder coating composition having an average particle diameter of 6 μm. The coating composition was tested in the same manner as that in Example 1 to give the results shown in Table 1.

EXAMPLE 5

In a reactor as used in Example 1, 150 parts of methanol were charged and heated to 90° C., to which were gradually added 40 parts of methyl methacrylate, 30 parts of glycidyl methacrylate, 115 parts of styrene, 15 parts of n-butyl methacrylate and 6 parts of azobisisobutylonitrile with stirring through 4 hours while maintaining the mixture at 90° C. The reaction mixture was further maintained at that temperature for 6 hours to obtain a resin solution. In a similar reactor as used above, 150 parts of methanol, 24.3 parts of dodecane dicarboxylic acid, 0.6 part of benzoin and 0.6 part of a leveling agent (Modaflow) were charged and stirred to obtain a curing agent solution. The resin solution and the curing agent solution were fed to a static mixer and mixed there for a short period of time. The resulting mixture was then fed to a spray dryer and spray-dried to obtain a powder coating composition having an average particle diameter of 52 μm. The coating composition was tested in the same manner as that in Example 1 to give the results shown in Table 2.

COMPARATIVE EXAMPLE 1

In a reactor as used in Example 1, 100 parts of xylene were charged and heated to 115° C., to which were gradually added 40 parts of methyl methacrylate, 30 parts of glycidyl methacrylate, 15 parts of styrene, 15 parts of n-butyl acrylate and 4 parts of azobisisobutylonitrile with stirring through 4 hours while maintaining the mixture at 115° C. The reaction mixture was further maintained at that temperature for 6 hours and then vacuum-distilled at 200° C. and 1 mmHg until no solvents were distilled. The resin thus obtained (50 parts) was coarsely pulverized and mixed with 12 parts of dodecane dicarboxylic acid, 0.3 part of benzoin, 0.3 part of a leveling agent (Modaflow) and 25 parts of titanium oxide. The mixture was then milled. About 10 hours were required to obtain a uniform mixture. This was then kneaded, ground and sieved to obtain a powder coating composition having an average particle diameter of 38 μm. The coating composition was tested in the same manner as that in Example 1 to give the results shown in Table 2.

COMPARATIVE EXAMPLE 2

In a reactor as used in Example 1, 100 parts of xylene were charged and heated to 120° C., to which were gradually added 20 parts of methyl methacrylate, 20 parts of glycidyl methacrylate, 40 parts of styrene, 15 parts of n-butyl acrylate and 6 parts of azobisisobutylonitrile with stirring through 4 hours while maintaining the mixture at 120° C. The reaction mixture was further maintained at that temperature for 6 hours to obtain a resin solution. Thereafter, 50 parts of methanol, 20 parts of dodecane dicarboxylic acid, 0.6 part of benzoin and 0.6 part of a leveling agent (Modaflow) were added to the resin solution and the blend was stirred for 2 hours to obtain a uniform mixture. This mixture was charged in an extruder provided with a plurality of vent ports and extruded into strands and pelletized. The pellets were ground and sieved to obtain a powder coating composition having an average particle diameter of 41 μm. The powder coating composition was tested in the same manner as that in Example 1 to give the results shown in Table 2.

COMPARATIVE EXAMPLE 3

In a reactor as used in Example 1, 67 parts of xylene were charged and heated to 150° C., to which were gradually added 15 parts of methyl methacrylate, 40 parts of glycidyl methacrylate, 30 parts of styrene, 15 parts of n-butyl acrylate and 4 parts of 2,2'-azobis(2,4-dimethylvaleronitrile) with stirring through 4 hours while maintaining the mixture at 150° C. The reaction mixture was further maintained at that temperature for 6 hours to obtain a resin solution. Thereafter, a mixture containing 33 parts of xylene, 20 parts of dodecane dicarboxylic acid, 0.6 part of benzoin and 0.6 part of a leveling agent (Modaflow) was added to the resin solution and the blend was stirred for 2 hours to obtain a uniform mixture. This mixture was fed to a spray dryer. However, because xylene was not vaporized well, it was impossible to obtain a powder coating composition. The product thus obtained was found to have poor anti-blocking property.

TABLE 1

|  | Example No. | | | |
| --- | --- | --- | --- | --- |
|  | 1 | 2 | 3 | 4 |
| Non-volatile Matter Content (wt. %) | 99.6 | 99.1 | 99.8 | 99.4 |
| Average Particle Diameter (·μm) | 15 | 15 | 6 | 6 |
| Anti-blocking Property | A | A | A | A |
| Thickness of Coat (μm) | 53 | 32 | 24 | 25 |
| Surface Smoothness | A | A | A | A |
| Gloss (at 60°) | 95 | 93 | 96 | 97 |

TABLE 2

|  | Example | Comparative Example No | | |
| --- | --- | --- | --- | --- |
|  | No. 5 | 1 | 2 | 3 |
| Non-volatile Matter Content (wt. %) | 99.6 | 98.5 | 92 | 75 |
| Average Particle Diameter (·μm) | 52 | 38 | 41 | — |
| Anti-blocking Property | A | B | C | C |
| Thickness of Coat (μm) | 72 | 62 | 65 | 69 |
| Surface Smoothness | A | B | C | — |
| Gloss (at 60°) | 95 | 88 | 84 | — |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Applications No. H10-156054, filed Jun. 4, 1998 and No. H10-203529, filed Jul. 17, 1998, inclusive of the specification and claims, are hereby incorporated by reference herein.

What is claimed is:

1. A process for the preparation of a powder coating composition, comprising the steps of:

copolymerizing 5–90% by weight of at least one monomeric compound selected from the group consisting of glycidyl group-containing unsaturated compounds and methylglycidyl group-containing unsaturated compounds with 95–10% by weight of an ethylenically unsaturated monomer in methanol to obtain a resin solution; and spray-drying said resin solution to obtain a powdery resin.

2. A process as claimed in claim 1, wherein said methanol is present in said resin solution in an amount of 5–99.99% by weight.

3. A process as claimed in claim 1, wherein said glycidyl group-containing unsaturated compounds are selected from the group consisting of glycidyl acrylate and glycidyl methacrylate and said methylglycidyl group-containing unsaturated compounds are selected from the group consisting of methylglycidyl acrylate and methylglycidyl methacrylate.

4. A process as claimed in claim 1, wherein said ethylenically unsaturated monomer is at least one member selected from the group consisting of alkyl acrylates, alkyl methacrylates, cycloalkyl acrylates, cycloalkyl methacrylates, hydroxyalkyl acrylates, hydroxyalkyl methacrylates, styrene, α-alkylstyrenes, acrylonitrile, acrylamide and methacrylamide.

5. A process as claimed in claim 1, further comprising, before said spray-drying step, mixing said resin solution with at least one member selected from the group consisting of curing agents, pigments and additives.

6. A process as claimed in claim 1, further comprising, before said spray-drying step, mixing said resin solution with a methanol solution or dispersion containing at least one member selected from the group consisting of curing agents, pigments and additives using a continuous mixer.

7. A process as claimed in claim 1 wherein said spraying is performed so that the powder coating composition thereby obtained has a volatile matter content of 1.5% by weight or less.

8. A process as claimed in claim 1 wherein said spraying is performed so that the powder coating composition thereby obtained has a volatile matter content of 1.0% by weight or less.

9. A process as claimed in claim 1 wherein said spraying is performed so that the powder coating composition thereby obtained has a volatile matter content of 0.5% by weight or less.

* * * * *